United States Patent [19]
Yasumatsuya

[11] 3,774,069
[45] Nov. 20, 1973

[54] VERTICAL DEFLECTION DEVICE FOR USE IN TELEVISION RECEIVERS

[75] Inventor: Noboru Yasumatsuya, Kadoma, Japan

[73] Assignee: Matsushita Electric Industrial Co., Ltd., Osaka-fu, Japan

[22] Filed: Dec. 13, 1971

[21] Appl. No.: 207,016

[52] U.S. Cl. .............................................. 315/27 TD
[51] Int. Cl. .............................................. H01j 29/70
[58] Field of Search ...................... 315/27 R, 27 TD, 315/26

[56] References Cited

UNITED STATES PATENTS

| | | | |
|---|---|---|---|
| 3,434,004 | 3/1969 | Smeulers et al. | 315/27 TD |
| 2,964,673 | 12/1960 | Stanley | 315/27 TD |
| 3,544,810 | 12/1970 | McDonald et al. | 315/27 TD |
| 3,553,478 | 1/1971 | Steinbacher | 315/27 TD |

*Primary Examiner*—Carl D. Quarforth
*Assistant Examiner*—J. M. Potenza
*Attorney*—Milton J. Wayne et al.

[57] ABSTRACT

In a vertical deflection device for use in a television receiver comprising a pulse oscillator, a switching element actuable in response to a pulse from the pulse oscillator, an integrating circuit connected to the switching element, and a deflection coil connected to the integrating circuit, the fly-back pulse applied to the input terminal of the deflection coil or a pulse obtained by shaping said fly-back pulse is applied to the switching element. Stable vertical deflection can be ensured independently of the variation of the pulse width of the pulse generated by the pulse oscillator.

6 Claims, 9 Drawing Figures

VERTICAL DEFLECTION DEVICE FOR USE IN TELEVISION RECEIVERS

BACKGROUND OF THE INVENTION

The present invention relates to a vertical deflection device for use in television receivers or the like.

In the prior art vertical deflection device for a television receiver or the like generally consisting of a pulse oscillator, a switching element actuable in response to the pulses from the oscillator, an integrating circuit connected to the switching element, and a deflection coil connected to the integrating circuit, the amplitude of the saw-tooth wave voltage appearing at the output terminal of the switching element is varied depending upon the pulse width of the switching pulses. Therefore the vertical amplitude of the picture is varied even when the synchronization control knob is rotated in the synchronizing range.

Another defect of the prior art vertical deflection device of the type described is that the operation becomes unstable, causing the malfunction when the relation $\tau_A \geqq \tau_C$ is not satisfied, where $\tau_A$ is the pulse width of the pulses for driving the integrating circuit and $\tau_C$ is the pulse width of the pulse generated in the output circuit during the fly-back time. Therefore, the design of the pulse oscillators becomes very complex and difficult, and there is a tendency that the fly-back time of the sawtooth wave output voltage becomes longer.

SUMMARY OF THE INVENTION

The present invention was made to overcome the problems encountered in the prior art vertical deflection devices.

A first object of the present invention is therefore to provide a vertical deflection device capable of a stable vertical deflection even when there is some variation in the pulse width of the pulses generated by a pulse oscillator for driving a switching element which, in turn, actuates a Miller integrating circuit.

A second object of the present invention is to provide various vertical deflection devices for practical use which can accomplish said first object of the present invention.

Briefly stated, according to the present invention, the pulse width of the pulses generated by the pulse oscillator is made shorter than the pulse width of the pulse appearing at the input terminal of the deflection coil during the fly-back time, and the pulse generated by the pulse oscillator and the pulse appearing at the input terminal of the deflection coil or the pulse obtained in response to said second mentioned pulse are applied simultaneously to the input terminal of the switching element.

The above and other objects, features and advantages of the present invention will become more apparent from the following description of the preferred embodiments thereof in comparison with the prior art devices and taken in conjunction with the accompanying drawings.

DESCRIPTION OF THE PREFERRED EMBODIMENTS

(PRIOR ART)

Figure 1:
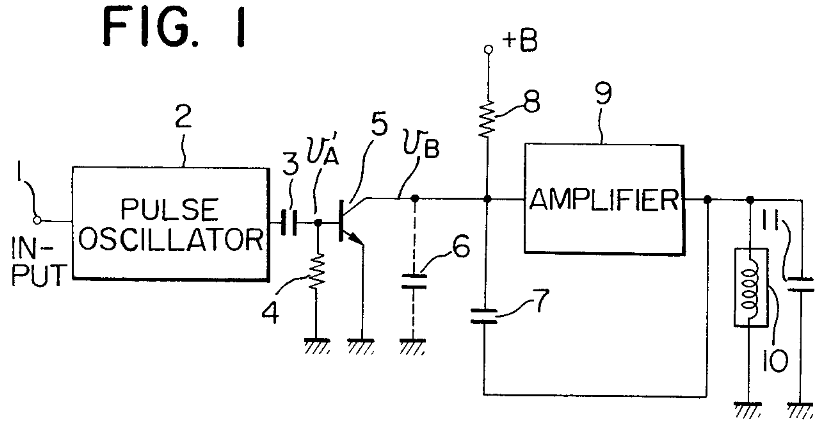
FIGS. 1 and 2 are circuit diagrams of the two prior art vertical deflection devices respectively.

Prior to the description of the preferred embodiment of the present invention, the prior art circuits will be described briefly with reference to FIGS. 1–5 in order to explain clearly the problems or defects thereof which the present invention succeeded in overcoming. First referring to FIG. 1, reference numeral 1 designates a vertical synchronizing signal input terminal; 2, a pulse oscillator; 3, a coupling capacitor; 4, a discharge resistor; 5 a switching transistor; 7, a capacitor in a Miller integrating circuit; 8, a charging resistor; 9, a phase-inverting amplifier; 10, a vertical deflection coil; and 11, a pulse width determination capacitor which is shown as including the distributed capacitance of the vertical deflection coil 10. Since the capacitor 7 is interconnected between the input and output terminals of the phase-inverting amplifier 9, the equivalent capacitance seen from the input terminal is increased in proportion to the voltage amplification, and becomes equivalent to a circuit in which a capacitor 6 is inserted. When the +B voltage source is connected to the charging resistor 8 and the switching element 5 is actuated with a predetermined cycle, the saw-tooth wave voltage having a better linearity can be obtained as is well known in the art.

Figure 2:
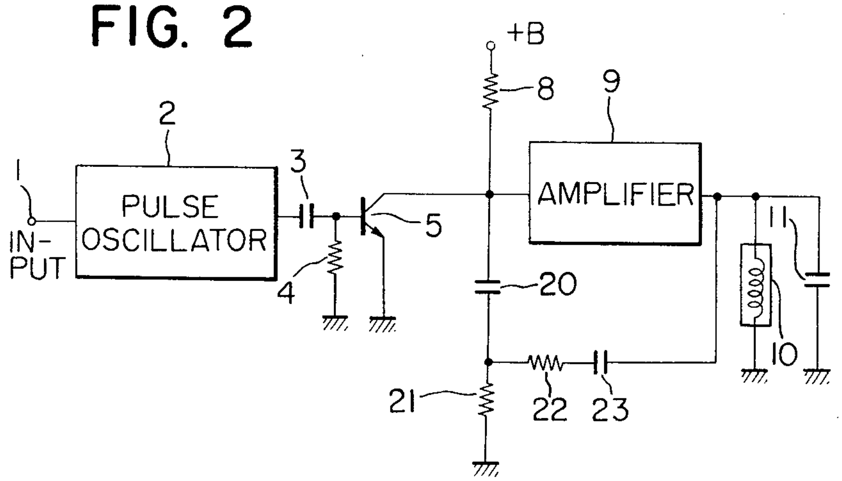

In the prior art circuit shown in FIG. 2, two capacitors 20 and 23 and two resistors 21 and 22 are used in place of the capacitor 7 in the circuit shown in FIG. 1, so that a desired linear portion of the saw-tooth wave voltage may be obtained. The function is substantially similar to that of the circuit shown in FIG. 1.

Figure 3:
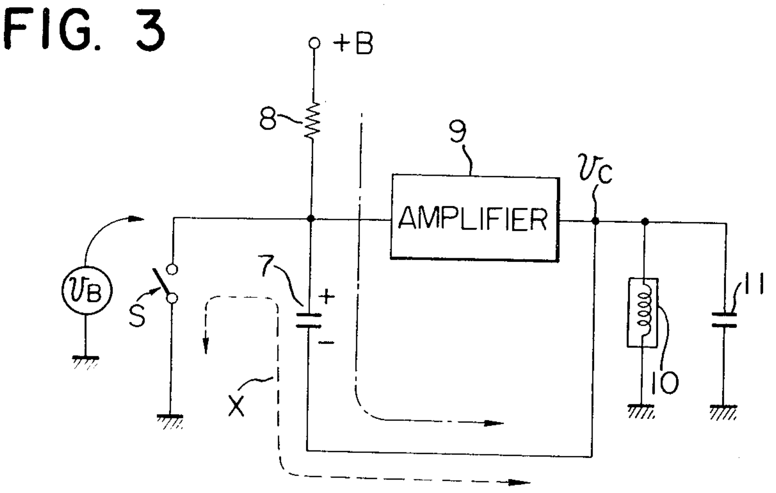
FIG. 3 is a simplified circuit diagram of the circuit shown in FIG. 1.

One of the common defects of the vertical deflection devices of the type shown in FIGS. 1 and 2 is that the amplitude of the saw-tooth voltage appearing at the output terminal of the switching element is varied depending upon the pulse width of the switching pulses. This will be described in some detail with reference to FIG. 3 illustrating the simplified version of the circuit shown in FIG. 1.

Figure 4:
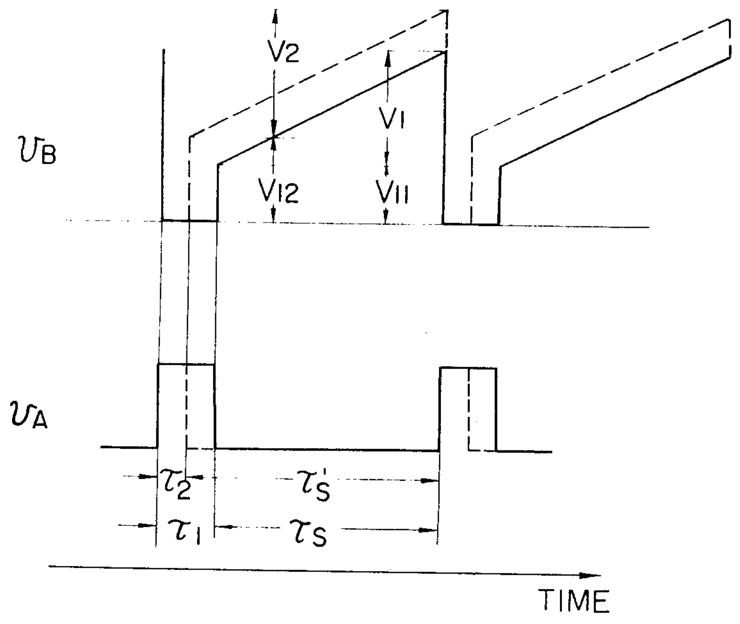
FIGS. 4 and 5 are diagrams of the output waveforms used for explanation of the modes of operations of the circuits shown in FIGS. 1 and 2.
Figure 5:
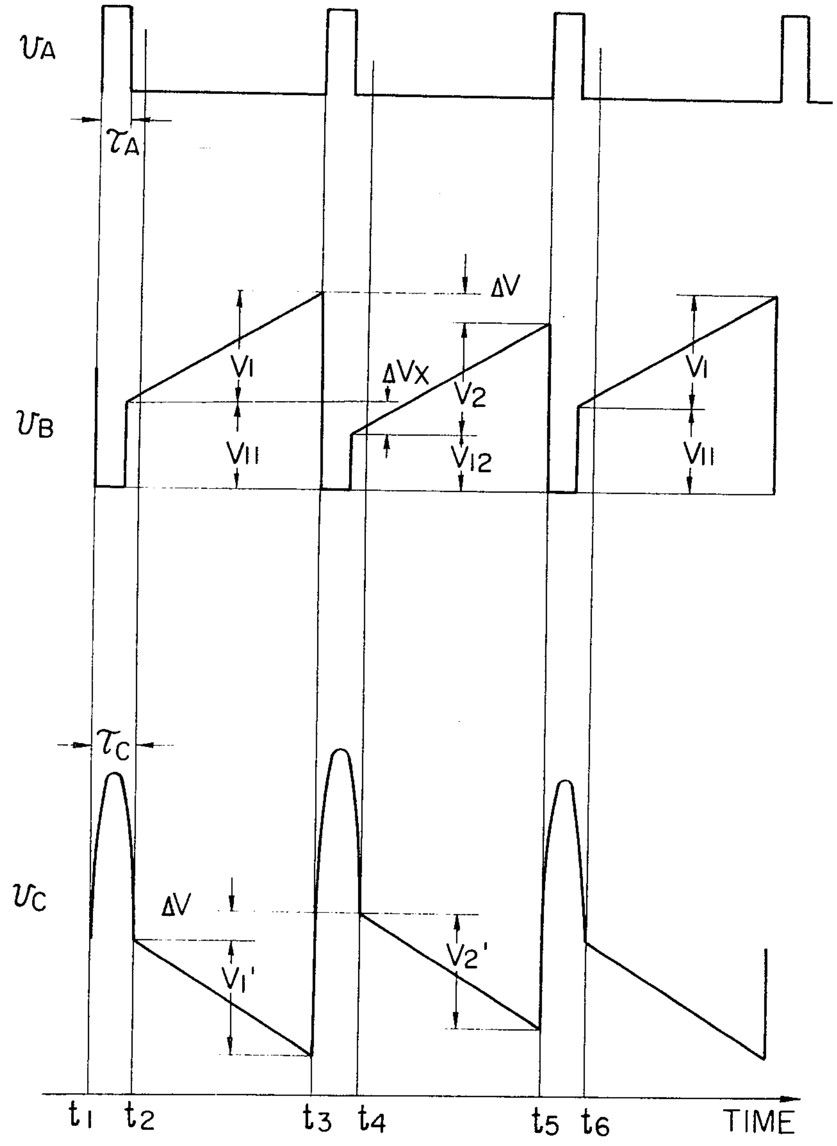

It is seen that the switching element 5 is shown as a switch S. As shown in FIG. 4, the saw-tooth wave voltage $V_B$ is varied depending upon the width of the switching pulses $V_A$ which closes the switch S during a time interval $\tau_1$ or $\tau_2$. In case of the pulse width $\tau_1$, when the switch S is closed, the capacitor 7 is discharged in the direction indicated by the dotted lines X, and the output voltage $V_C$ of the amplifier 9 has a positive value, so that the capacitor 7 is again charged with the polarities reversed. As a result, for a very short time interval after the switch S is closed, the charge in the capacitor 7 is reduced. After a time interval or pulse width $\tau_1$, the switch S is opened, so that the capacitor 7 is charged by the current from the +B voltage source through the charging resistor 8 with the polarity shown by the chain line. Therefore, as shown in FIG. 4, the voltage $V_B$ increases linearly from $V_{11}$. After a time interval $\tau_S$, the switch S is closed again for a time interval $\tau_1$ to discharge the capacitor 7 in the manner described above.

However, when the pulse width is changed to $\tau_2$ the discharge time is reduced so that the voltage when the charging is started changes from $V_{11}$ to $V_{12}$ because the charge discharged from the capacitor 7 is in proportion to the time interval the switch S is closed. Therefore, the charging time is increased whereas the discharge time is reduced so that the saw-tooth wave voltage changes its amplitude from $V_1$ to $V_2$. The pulse width of the switching pulses is varied depending upon the lack of uniformity of the product and characteristic of the active elements such as transistors, the variation in voltage of the voltage source or the like, so that some variation in pulse width cannot be avoided. Furtheremore, the pulse oscillator 2 is constructed in general to synchronize in response to the vertical synchronizing signals, and to have a lock-in range (for example 10 - 20 $H_Z$) and a following range of synchronizing. The pulse width is varied within the lock-in and following ranges beyond a tolerable range especially in case of the direct synchronization method which is widely used in the vertical deflection circuits. Therefore, when the Miller integrating circuit is driven by the oscillator circuit, the vertical amplitude is varied even when the synchronization control knob is rotated in the synchronizing range.

Another defect of the prior art vertical deflection circuits is that unless the relation $\tau_A \geqq \tau_C$ is held, where $\tau_A$ is the pulse width of the pulses driving the Miller integrating circuit and $\tau_C$ is the pulse width of the pulse generated in the flyback time, the operation becomes unstable, causing malfunction. As a result, the design of the pulse oscillator 2 becomes difficult, and there is a tendency for the fly-back time of the saw-tooth wave voltage of the pulse oscillator become longer. This will be further described with reference to FIGS. 3 and 5. The major cause which brings about the malfunction under the condition of $\tau_A < \tau_C$ is that the quantity of the charge discharged from the capacitor 7 in the circuit shown in FIG. 3 is affected by the fly-back pulse of the output voltage $V_C$. For example, when the amplitude of the fly-back pulse $V_C$ which occurs from time $t_1$ to $t_2$ is reduced for any reason, the quantity of the discharged charge of the capacitor 7 is reduced and $V_B$ is increased to $V_{11}$ at $t_2$ when the next charging is started. As a result, the amplitude of the fly-back pulse between $t_3$ and $t_4$ is increased. Therefore $V_B$ is reduced to $V_{12}$ at time $t_4$ at which the charging is started again so that the amplitude of the flyback pulse between $t_5$ and $t_6$ is decreased again. Because of the repetitive operations described above, there is a voltage difference $\Delta V$ between the voltages $V_C$ at the starts of the odd fields and the even fields. As a consequence, two pictures on the picture tube are slightly displaced vertically. When the ratio of the difference $\Delta V_X$ of the voltage $V_B$ at the starts of the odd fields and the even fields to the difference of the voltages $V_C$ at the starts of the odd fields and the even fields is less, the malfunction described above will not occur in some cases. However, the operation is so unstable as to cause a jitter in the vertical direction. Therefore, the pulse oscillator 2 must be constructed under the condition of $\tau_A \geqq \tau_C$ in view of the lack of uniformity of the active elements, the ambient temperature, the variation of the power source, the variation in pulse width in the lock-in and following ranges of synchronizing. Thus, the design of the pulse oscillator 2 becomes very complex and difficult.

Briefly stated, the underlying principle of the present invention is that the output pulse width $\tau_A'$ of the pulse oscillator is made smaller than the fly-back pulse width $\tau_C$ of the output voltage, and the output pulse of the pulse oscillator is mixed with the pulse which is obtained by shaping a part of the fly-back pulse and is supplied to the switching transistor, so that as far as $\tau_A' < \tau_C$ the relation $\tau_A = \tau_C$ is held even when the pulse width $\tau_A'$ of the pulse oscillator is varied, as will become more apparent from the following description of the preferred embodiment of the present invention.

Figure 7:
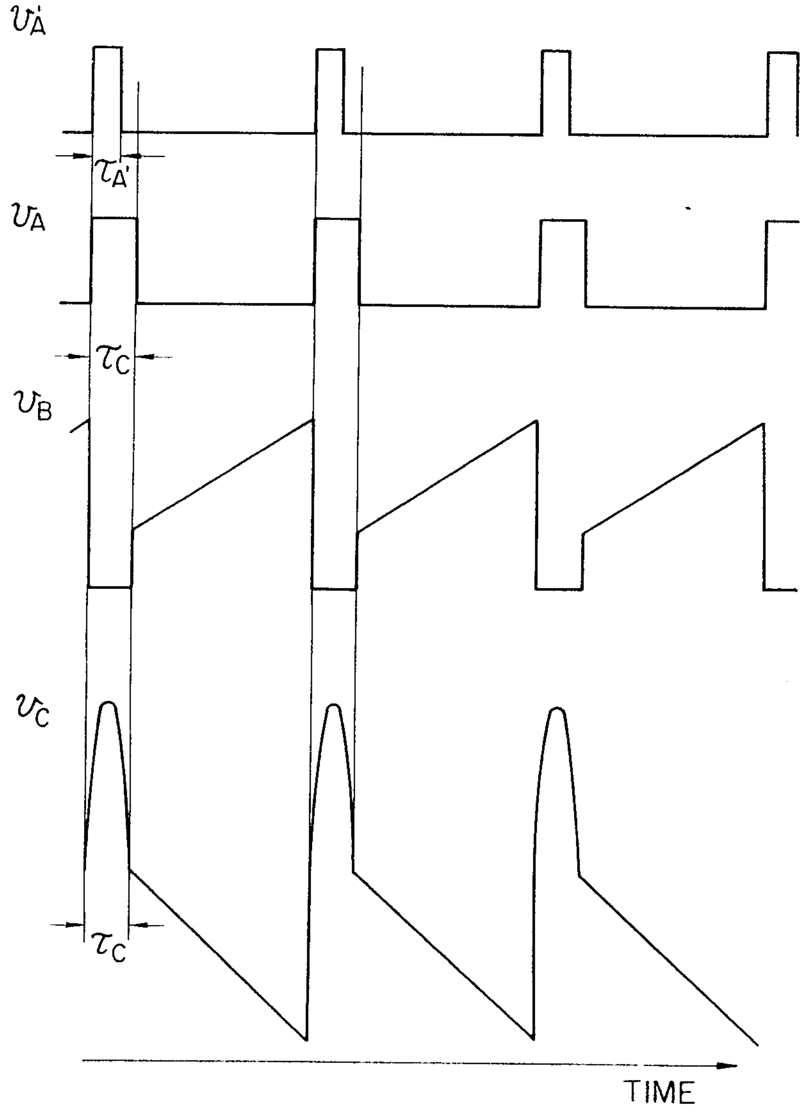
FIG. 7 is a diagram illustrating the output waveforms of the circuit shown in FIG. 6 used for explanation of the mode of operation thereof.
Figure 6:
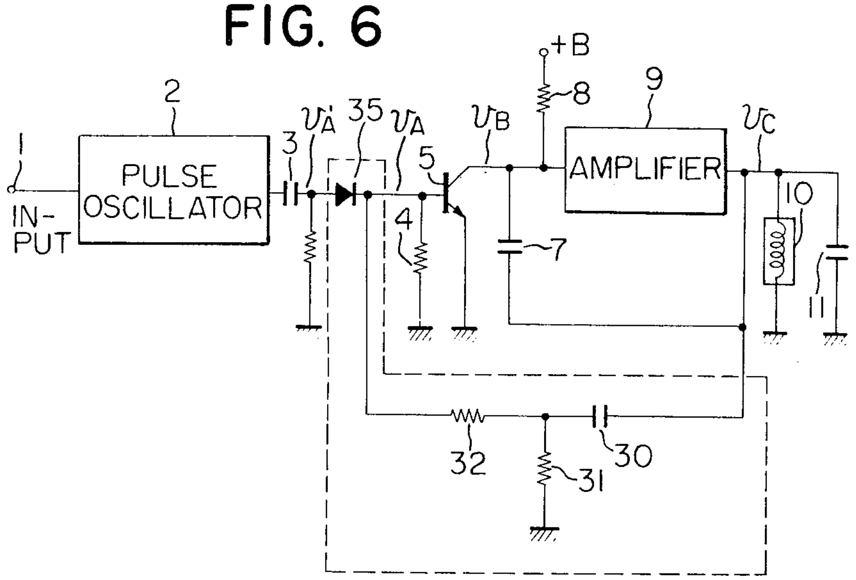
FIG. 6 is a circuit diagram of a first embodiment of a vertical deflection device in accordance with the present invention.

The vertical deflection circuit in accordance with the present invention shown in FIG. 6 is similar to that shown in FIG. 1 except for the arrangement encircled by the dotted lines, same parts being designated by the same reference numerals in FIGS. 1 and 6. The output voltage $V_C$ of the amplifier 9 is applied to a differentiation circuit consisting of a capacitor 30 and a resistor 31, so that the fly-back pulse whose amplitude is adjusted by a resistor 32, may be applied to the base of the switching transistor 5. The output of the pulse oscillator 2 is also fed to the base of the switching transistor 5 through the capacitor 3 and a diode 35. The relation among voltages $V_A$, $V_A'$, $V_B$ and $V_C$ is shown in FIG. 7. The diode 35 is used in order to eliminate the adverse effect, upon any operation of the pulse oscillator 2, of the shaped back-line pulse $V_C$ appearing at the output terminal of the pulse oscillator 2. Because of the arrangement described above, as far as $\tau_A' < \tau_C$, the pulse width of $V_A$ or the discharge time of the capacitor 7 remains $\tau_C$ whatever the variation of $\tau_A'$ may be, whereby the condition for the stable operation of the circuit may be established.

Figure 8:
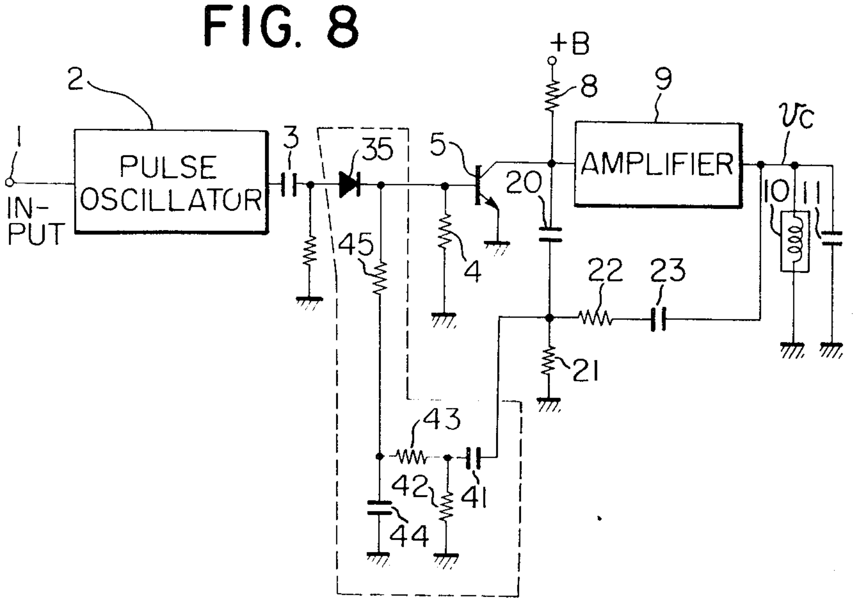
FIGS. 8 and 9 are circuit diagrams of a second and third embodiments of the present invention respectively.

The second embodiment of the present invention shown in FIG. 8 is similar to the prior art vertical deflection circuit shown in FIG. 2 except for the arrangement encircled by the dotted lines, the same reference numerals being used to designate the same parts in FIGS. 2 and 8. In the second embodiment, the voltage $V_C$ is not directly differentiated, but the voltage at the junction of the capacitor 20 and the resistor 22 is applied to a differentiation circuit consisting of a capacitor 41 and a resistor 42, and is fed to the base of the switching transistor 5 after the amplitude is appropriately adjusted by resistors 43 and 45. A capacitor 44 is inserted in order to eliminate the horizontal pulse component in the voltage $V_C$. The function of the second embodiment is substantially similar to that of the circuit shown in FIG. 6.

Figure 9:
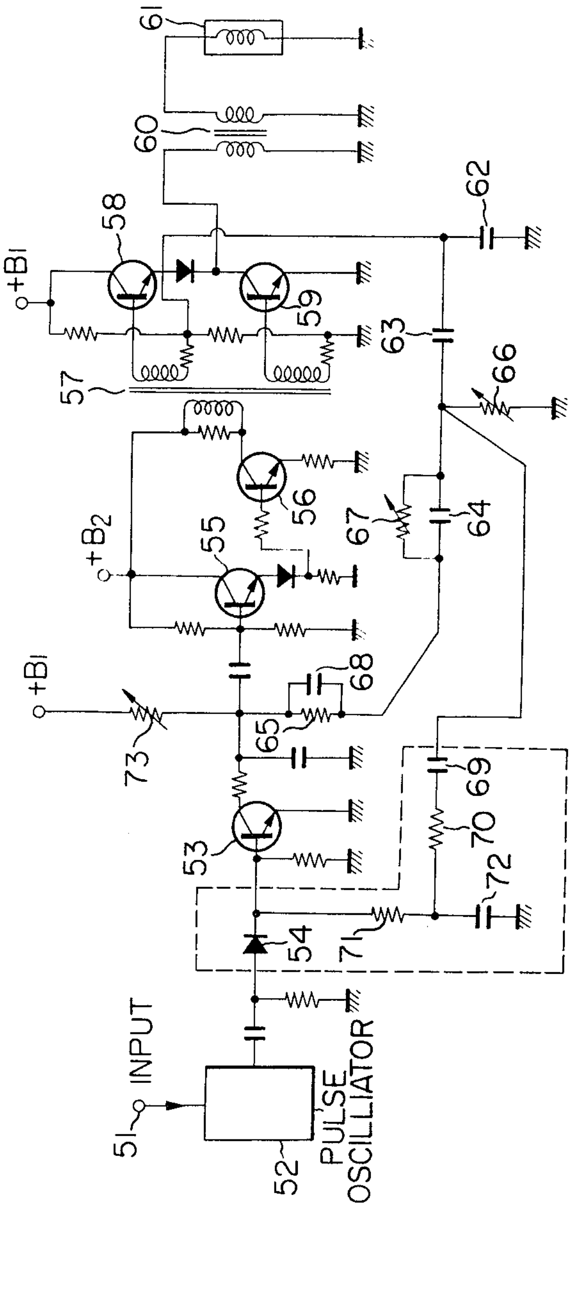

A practical circuit in accordance with the present invention is illustrated in FIG. 9. The vertical synchronizing signal is applied to an input terminal 51 to drive a pulse oscillator 52 the pulse width of the output pulse of which is selected to be smaller than the pulse width of the fly-back pulse generated in an output circuit as in the case of the first and second embodiments shown in FIGS. 6, 7 and 8. The output of the pulse oscillator 52 is fed to a switching transistor 53 through a diode 54. The outputs of a drive circuit consisting of transistors 55 and 56 are converted into two signals 180° out of phase relative to each other by a drive transformer 57, which are fed to the bases of output transistors 58 and 59 respectively. The transistors 58 and 59 are so biased to operate in class "B." The output of the class "B" output circuit consisting of the transistors 58 and 59 is applied to a vertical deflection coil 61 through an output transformer 60. A capacitor 62 is inserted in order to determine the pulse width of the fly-back pulse. A part of the output from the class "B" output circuit is fed back to the base of the transistor 55 through capacitors 63 and 64 and a resistor 65 which constitute a Miller integrating circuit. The frequency characteristic of the feedback loop can be varied by variable resistors 66 and 67 together with the fixed resistor 65, so that the linearity of the output voltage may be adjusted. A capacitor 68 is inserted in order to prevent the oscillation. The positive pulse voltage which appears at the junction between the capacitors 63 and 64 is applied to the base of the transistor 53 through a capacitor 69 and resistors 70 and 71. A capacitor 72 is inserted in order to eliminate the horizontal pulse component, and its value will not adversely affect the fundamental function of the circuit. The output voltage may be adjusted by a variable charging resistor 73. The function of the circuit is substantially similar to that of the first and second embodiments described with reference to FIGS. 6, 7 and 8 and is apparent to those skilled in the art, so that a further detailed description thereof appears unnecessary.

As is clear from the foregoing description, according to the present invention, the pulse width of the pulse generated by the pulse oscillator during the fly-back time is shorter than the pulse width of the pulse appearing at the input terminal of the deflection coil, and the pulse generated by the pulse oscillator and the pulse at the input terminal of the deflection coil are applied to the switching element which feeds the rectangular wave to the integrating circuit. Therefore, since the pulse width of the pulse generated from the pulse oscillator is smaller than the pulse width of the output pulse, the output voltage remains unchanged whatever the variation of the pulse width of the pulse from the pulse oscillator may be. Thus stable vertical deflection can be accomplished regardless the lack of uniformity and aging of the parts in the pulse oscillator, and the variation in output within the lock-in and following ranges of synchronizing may be eliminated.

What is claimed is:

1. A vertical deflection device comprising a pulse oscillator which oscillates in synchronism with
synchronizing signals applied thereto;
a switching element driven by said oscillator;
an integrating circuit connected to the output terminal of said switching element;
a deflection coil connected to said integrating circuit;
the pulse width of the pulse generated by said pulse oscillator being smaller than the pulse width of the pulse appearing at the connection between said deflection coil and integrating circuit during the fly-back time, and means applying the pulse from said pulse oscillator and one of the pulse appearing at said connection of said deflection coil and the pulse produced in response to said second mentioned pulse to said switching element whereby the switching time of said switching element is determined by said one pulse.

2. A vertical deflection device as set forth in claim 1 wherein a differentiation circuit is connected to said connection of said vertical deflection coil, and the output of said differentiation circuit is limited in amplitude and applied to the input terminal of said switching element.

3. A vertical deflection device as set forth in claim 1 wherein
a differentiation circuit consisting of a capacitor and a resistor is connected to said connection of said deflection coil;
the output of said differentiation circuit is applied to the input terminal of said switching element through a resistor; and
the output of said pulse oscillator is simultaneously applied to said input terminal of said switching element through a diode.

4. A vertical deflection device as set forth in claim 1 wherein
said integrating circuit is a Miller integrating circuit comprised of an amplifier and a capacitance feedback circuit.

5. A vertical deflection device as set forth in claim 4 wherein
a circuit for differentiating the signal from said capacitance feedback circuit is provided, and the output waveform of said differentiating circuit is shaped for application to said switching circuit as the input.

6. In a vertical deflection system having a source of synchronizing signals, a deflection coil system including means providing fly-back pulses, and means for driving said deflection coil system; the improvement wherein said driving means comprises a pulse oscillator for generating first pulses of lesser duration than said fly-back pulses and connected for synchronization to said source of synchronizing signals, a switching element, an integrating circuit connected to the output of said switching element, means connecting said coil system to the output of said integrating circuit, and means for controlling said switching element comprising means applying said first pulses to said switching circuit for controlling the initiation of operation of said switching element, and means responsive to said fly-back pulses for controlling the operation period of said switching element as a function of the width of said fly-back pulses.

* * * * *